Jan. 26, 1926. 1,570,986
C. H. AYARS
CANNING MACHINE
Filed Jan. 23, 1924 3 Sheets-Sheet 3

Patented Jan. 26, 1926.

1,570,986

UNITED STATES PATENT OFFICE.

CHARLES H. AYARS, OF SALEM, NEW JERSEY, ASSIGNOR TO AYARS MACHINE COMPANY, OF SALEM, NEW JERSEY.

CANNING MACHINE.

Application filed January 23, 1924. Serial No. 687,924.

*To all whom it may concern:*

Be it known that I, CHARLES H. AYARS, a citizen of the United States, residing at Salem, in the county of Salem and State of New Jersey, have invented certain new and useful Improvements in Canning Machines, of which the following is a specification.

My invention relates to canning machines and more particularly to means for lubricating the hopper to prevent adhesion of viscous material to its walls. In some machines adhesion of the materials to the walls of the main hopper is prevented by imparting rotation to the hopper. In such cases the main hopper usually feeds the material to a fixed or supplemental hopper of less depth which serves as a funnel to direct the material into a measuring unit and it is essential to provide against adhesion of material to the walls of the fixed hopper. If the main hopper is non-rotatable, whether used with or without a supplemental hopper, it is essential to prevent adhesion of the material to the main hopper. My invention is adapted for use with either hopper.

The objects of the invention are to provide means for injecting a part of the brine or syrup into the hopper so that its walls will be lubricated, and to provide means for automatically stopping the spray when operation of the machine is stopped.

These objects, and other advantageous ends which will be described hereinafter, I attain in the following manner, reference being had to the accompanying drawings in which—

Figure 1:
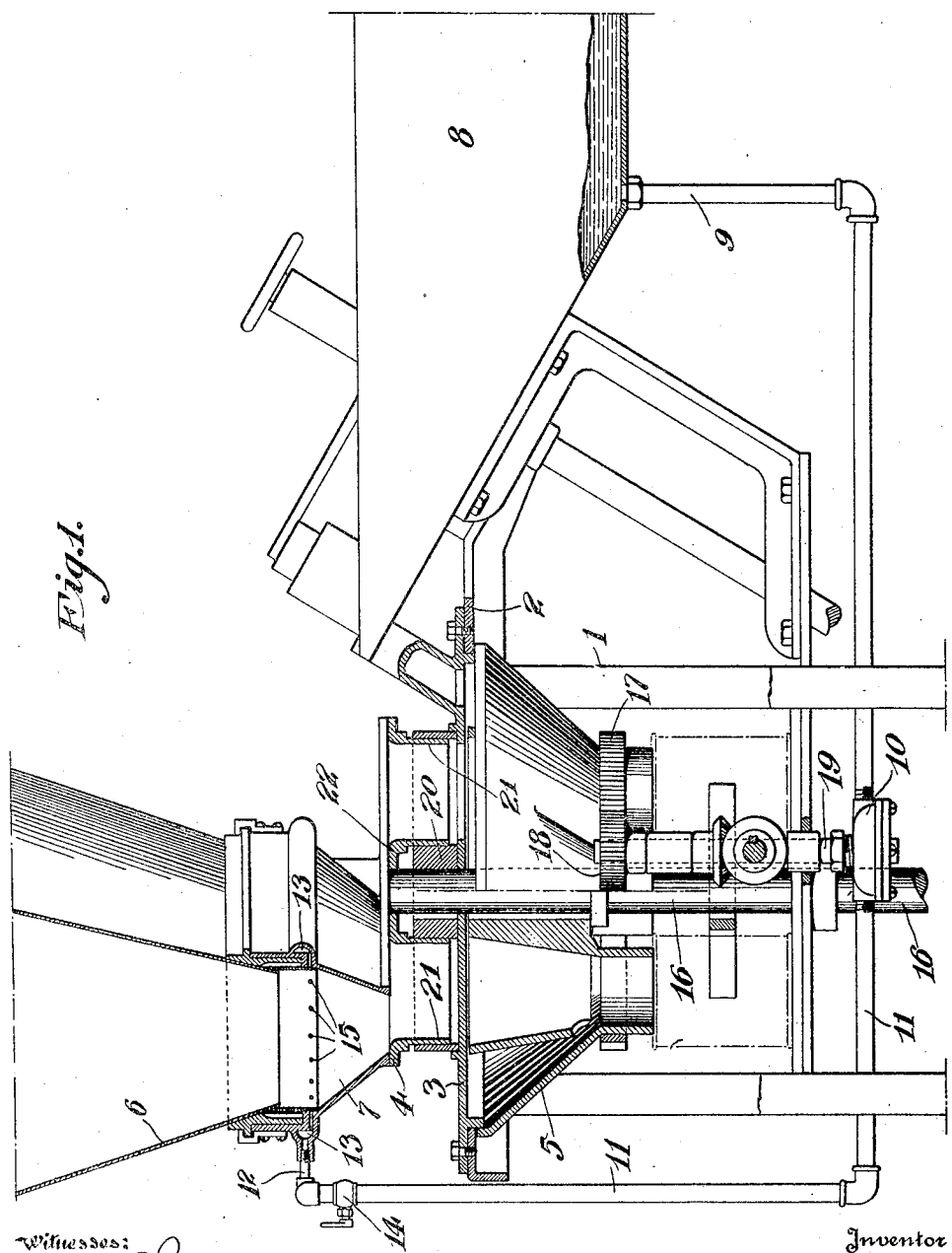
Figure 2:
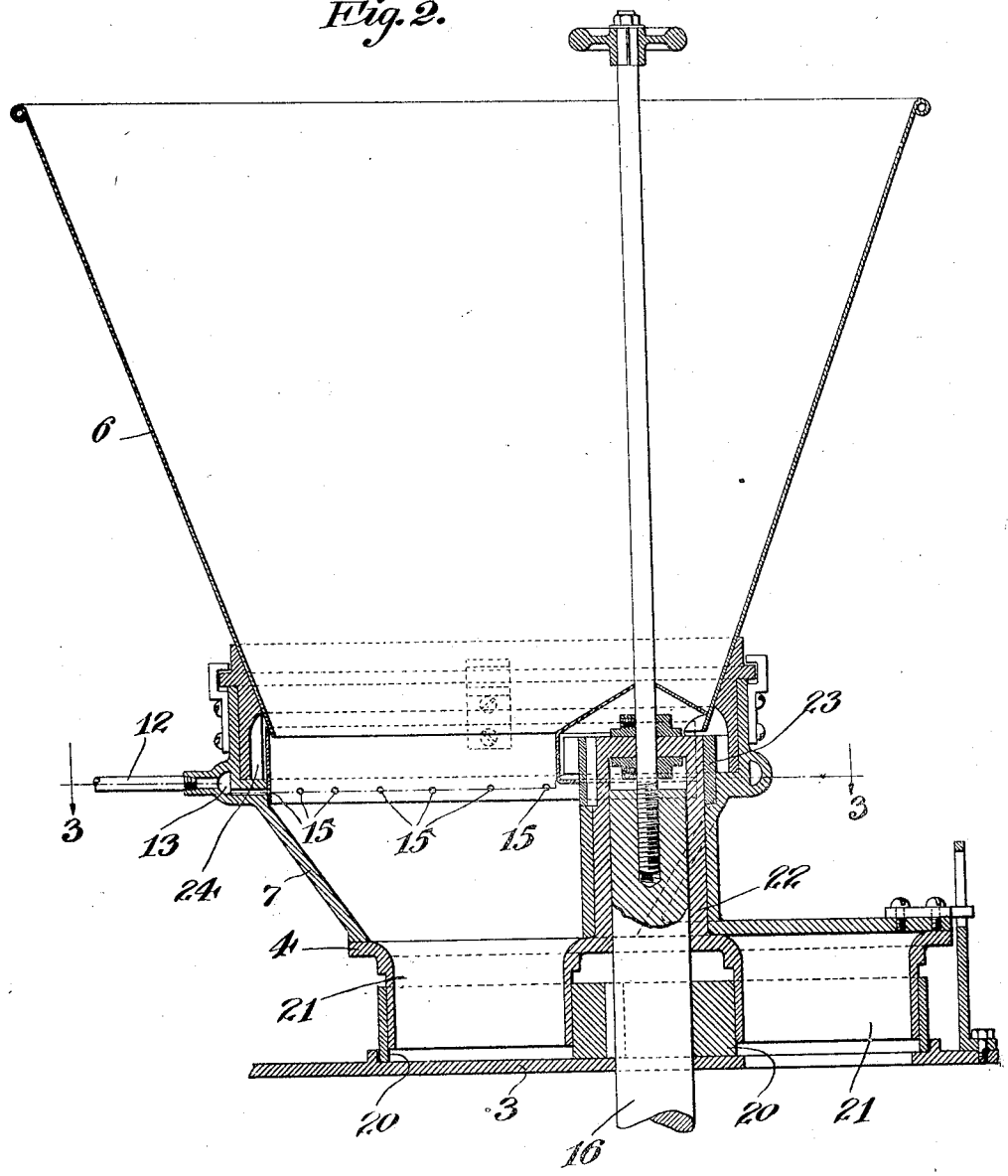
Figure 3:
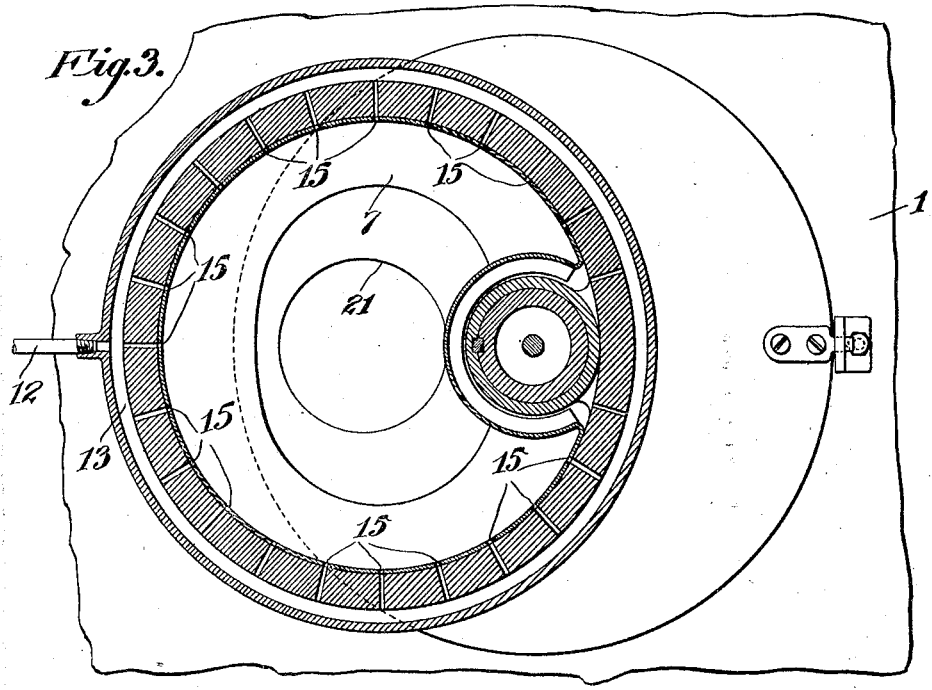
Figure 4:
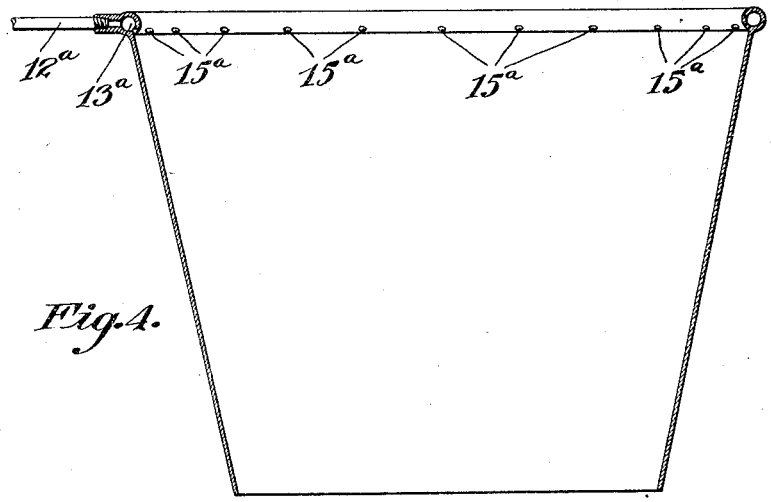

Figure 1 is a side elevation, partly in section, of a can feeding machine embodying my invention, Figure 2 a vertical section through the feed hopper and measuring wheel, Figure 3 a section on line 3—3 of Figure 2, and Figure 4 a vertical section of a feed hopper provided with a spraying device.

The numeral 1 indicates the frame of the machine, 2 the base plate, 3 the bed plate upon which the measuring wheel 4 rotates, 5 the distributing wheel through which the granular and liquid materials are fed to the cans, 6 the main hopper which is preferably rotatably mounted, 7 a stationary hopper through which the granular material passes from the main hopper to the measuring units, 8 the liquid tank, 9 a pipe leading from the bottom of the tank to a rotary pump 10 which forces the liquid through a pipe 11 and nipple 12 into a channel 13 encircling the top of stationary hopper 7, 14 a valve on pipe 11 for regulating the supply of liquid to channel 13, 15 a series of perforations in channel 13 through which the liquid flows into the hopper, and 16 a shaft through which rotary motion is imparted to the distributing wheel and measuring units and preferably to the main hopper. A ring gear 17, fixed to the bottom of distributing wheel 5, meshes with a gear 18 fixed to a shaft 19 which is connected with and drives pump 10. The liquid tank is positioned below the level of the perforated channel so that liquid will not flow into the channel by gravity.

While the machine is in operation the rotary pump forces a sufficient supply of liquid into channel 13 from which it passes into the stationary hopper and lubricates its wall so that none of the materials adhere to the wall.

If the main hopper is non-rotatable the spraying device should be applied to its top as shown in Figure 4 in which 12$^a$ indicates the nipple, 13$^a$ the annular channel and 15$^a$ the perforations through which the liquid passes to the hopper. The connections are the same except that pipe 11 leads to nipple 12$^a$ instead of nipple 12.

In the machine illustrated the measuring wheel consists of telescoping parts 20 and 21. Part 20 is splined to the shaft and rests upon the bed plate. Part 21 extends upwardly forming a boss 22 embracing the upper end of shaft 16. The boss carries a gear 23 which meshes with an internal gear 24 fixed to hopper 6. Rotation of shaft 16 imparts rotation to part 20 of the measuring wheel and part 20 imparts rotation to part 21 which imparts rotation to gear 23 and consequently to gear 24 which imparts rotation to hopper 6.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claim.

Having thus described my invention, what I claim as new and desire to secure by Letters Patent is:—

In a canning machine, a feed hopper provided with a perforated liquid channel encircling it at the top; a liquid-tank; a pump; a pipe leading from the liquid-tank to the pump; a pipe leading from the pump to the channel; a shaft adapted to actuate the pump; a rotatable distributing wheel arranged to receive material from the hopper and deliver it to the cans; a gear fixed to the distributing wheel, and a gear on the pump-actuating shaft meshing with the gear on the distributing wheel.

In testimony whereof I have signed my name to this specification.

CHARLES H. AYARS.